US006587186B2

(12) United States Patent
Bamji et al.

(10) Patent No.: US 6,587,186 B2
(45) Date of Patent: Jul. 1, 2003

(54) CMOS-COMPATIBLE THREE-DIMENSIONAL IMAGE SENSING USING REDUCED PEAK ENERGY

(75) Inventors: Cyrus Bamji, Fremont, CA (US); Edoardo Charbon, Berkeley, CA (US)

(73) Assignee: Canesta, Inc., San Jose, CA (US)

( * ) Notice: Subject to any disclaimer, the term of this patent is extended or adjusted under 35 U.S.C. 154(b) by 0 days.

(21) Appl. No.: 09/876,373

(22) Filed: Jun. 6, 2001

(65) Prior Publication Data

US 2001/0048519 A1 Dec. 6, 2001

Related U.S. Application Data

(60) Provisional application No. 60/209,948, filed on Jun. 6, 2000.

(51) Int. Cl.[7] ................................. G01C 3/08
(52) U.S. Cl. .................... 356/5.01; 356/5.04; 356/5.08; 356/5.09; 356/5.1
(58) Field of Search .................... 356/5.09–5.15, 356/28.5, 4.09, 4.1

(56) References Cited

U.S. PATENT DOCUMENTS 5,353,109 A * 10/1994 Langdon et al. ............ 356/28.5
5,940,170 A * 8/1999 Berg et al. .................. 356/5.1
6,181,412 B1 * 1/2001 Popescu et al. ............ 356/4.09

FOREIGN PATENT DOCUMENTS

DE 198 21 974 A1 11/1999 ............. G01J/9/00

* cited by examiner

Primary Examiner—Stephen C. Buczinski
(74) Attorney, Agent, or Firm—Dorsey & Whitney LLP

(57) ABSTRACT

A three-dimensional time-of-flight (TOF) system includes a low power optical emitter whose idealized output $S_1=\cos(\omega \cdot t)$ is reflected by a target distance z away as $S_2=A\cdot\cos(\omega \cdot t+\Phi)$, for detection by a two-dimensional array of pixel detectors and associated narrow bandwidth detector electronics and processing circuitry preferably fabricated on a common CMOS IC. Phase shift $\Phi$ is proportional to TOF or z, $z=\Phi\cdot C/2\cdot\omega=\Phi\cdot C/\{2\cdot(2\cdot\pi\cdot f)\}$, and A is brightness. $\Phi$, z, and A are determined by homodyne-mixing $S_2$ with an internally generated phase-delayed version of $S_1$, whose phase is dynamically forced to match the phase of $S_2$ by closed-loop feedback. Idealized mixer output per each pixel detector is $0.5\cdot A\cdot\{\cos(2\omega \cdot t+\Phi)+\cos(\Phi)\}$. On-chip circuitry can use TOE data to simultaneously measure distance, object point velocity, object contours, including user interface with virtual input devices.

20 Claims, 4 Drawing Sheets

CMOS-COMPATIBLE THREE-DIMENSIONAL IMAGE SENSING USING REDUCED PEAK ENERGY

RELATION TO PREVIOUSLY FILED APPLICATIONS

Priority is claimed from applicant's co-pending U.S. provisional patent application Ser. No. 60/209,948 filed on Jun. 6, 2000 entitled "3D Imaging Using Multiple Pixel Phase Detection on a CMOS Chip". Applicant also refers to and incorporates by reference herein U.S. utility application Ser. No. 09/401,059 filed Sep. 22, 1999 entitled "CMOS-Compatible Three-Dimensional Image Sensor IC", now U.S. Pat. No. 6,323,942 (2001).

FIELD OF THE INVENTION

The invention relates generally to range finder type image sensors, and more particularly to such sensors as may be implemented on a single integrated circuit using CMOS fabrication, and especially to reducing power consumption of systems utilizing such sensors.

BACKGROUND OF THE INVENTION

Electronic circuits that provide a measure of distance from the circuit to an object are known in the art, and may be exemplified by system 10 FIG. 1. In the generalized system of FIG. 1, imaging circuitry within system 10 is used to approximate the distance (e.g., Z1, Z2, Z3) to an object 20, the top portion of which is shown more distant from system 10 than is the bottom portion. Typically system 10 will include a light source 30 whose light output is focused by a lens 40 and directed toward the object to be imaged, here object 20. Other prior art systems do not provide an active light source 30 and instead rely upon and indeed require ambient light reflected by the object of interest.

Various fractions of the light from source 30 may be reflected by surface portions of object 20, and is focused by a lens 50. This return light falls upon various detector devices 60, e.g., photodiodes or the like, in an array on an integrated circuit (IC) 70. Devices 60 produce a rendering of the luminosity of an object (e.g., 10) in the scene from which distance data is to be inferred. In some applications devices 60 might be charge coupled devices (CCDs) or even arrays of CMOS devices.

CCDs typically are configured in a so-called bucket-brigade whereby light-detected charge by a first CCD is serial-coupled to an adjacent CCD, whose output in turn is coupled to a third CCD, and so on. This bucket-brigade configuration precludes fabricating processing circuitry on the same IC containing the CCD array. Further, CCDs provide a serial readout as opposed to a random readout. For example, if a CCD range finder system were used in a digital zoom lens application, even though most of the relevant data would be provided by a few of the CCDs in the array, it would nonetheless be necessary to readout the entire array to gain access to the relevant data, a time consuming process. In still and some motion photography applications, CCD-based systems might still find utility.

As noted, the upper portion of object 20 is intentionally shown more distant that the lower portion, which is to say distance Z3>Z3>Z1. In a range finder autofocus camera environment, one might try to have devices 60 approximate average distance from the camera (e.g., from Z=0) to object 10 by examining relative luminosity data obtained from the object. In some applications, e.g., range finding binoculars, the field of view is sufficiently small such that all objects in focus will be at substantially the same distance. But in general, luminosity-based systems do not work well. For example, in FIG. 1, the upper portion of object 20 is shown darker than the lower portion, and presumably is more distant than the lower portion. But in the real world, the more distant portion of an object could instead be shinier or brighter (e.g., reflect more optical energy) than a closer but darker portion of an object. In a complicated scene, it can be very difficult to approximate the focal distance to an object or subject standing against a background using change in luminosity to distinguish the subject from the background. In such various applications, circuits 80, 90, 100 within system 10 in FIG. 1 would assist in this signal processing. As noted, if IC 70 includes CCDs 60, other processing circuitry such as 80, 90, 100 are formed off-chip.

Unfortunately, reflected luminosity data does not provide a truly accurate rendering of distance because the reflectivity of the object is unknown. Thus, a distant object surface with a shiny surface may reflect as much light (perhaps more) than a closer object surface with a dull finish.

Other focusing systems are known in the art. Infrared (IR) autofocus systems for use in cameras or binoculars produce a single distance value that is an average or a minimum distance to all targets within the field of view. Other camera autofocus systems often require mechanical focusing of the lens onto the subject to determine distance. At best these prior art focus systems can focus a lens onto a single object in a field of view, but cannot simultaneously measure distance for all objects in the field of view.

In general, a reproduction or approximation of original luminosity values in a scene permits the human visual system to understand what objects were present in the scene and to estimate their relative locations stereoscopically. For non-stereoscopic images such as those rendered on an ordinary television screen, the human brain assesses apparent size, distance and shape of objects using past experience. Specialized computer programs can approximate object distance under special conditions.

Stereoscopic images allow a human observer to more accurately judge the distance of an object. However it is challenging for a computer program to judge object distance from a stereoscopic image. Errors are often present, and the required signal processing requires specialized hardware and computation. Stereoscopic images are at best an indirect way to produce a three-dimensional image suitable for direct computer use.

Many applications require directly obtaining a three-dimensional rendering of a scene. But in practice it is difficult to accurately extract distance and velocity data along a viewing axis from luminosity measurements. Nonetheless many applications require accurate distance and velocity tracking, for example an assembly line welding robot that must determine the precise distance and speed of the object to be welded. The necessary distance measurements may be erroneous due to varying lighting conditions and other shortcomings noted above. Such applications would benefit from a system that could directly capture three-dimensional imagery.

Although specialized three dimensional imaging systems exist in the nuclear magnetic resonance and scanning laser tomography fields, such systems require substantial equipment expenditures. Further, these systems are obtrusive, and are dedicated to specific tasks, e.g., imaging internal body organs.

In other applications, scanning laser range finding systems raster scan an image by using mirrors to deflect a laser beam in the x-axis and perhaps the y-axis plane. The angle of defection of each mirror is used to determine the coordinate of an image pixel being sampled. Such systems require precision detection of the angle of each mirror to determine which pixel is currently being sampled. Understandably having to provide precision moving mechanical parts add bulk, complexity, and cost to such range finding system. Further, because these systems sample each pixel sequentially, the number of complete image frames that can be sampled per unit time is limited.

In summation, there is a need for a system that can produce direct three-dimensional imaging. Preferably such system should be implementable on a single IC that includes both detectors and circuitry to process detection signals. Such single IC system should be implementable using CMOS fabrication techniques, should require few discrete components and have no moving components. Optionally, the system should be able to output data from the detectors in a non-sequential or random fashion. Very preferably, such system should require relatively low peak light emitting power such that inexpensive light emitters may be employed.

The present invention provides such a system.

SUMMARY OF THE PRESENT INVENTION

The present invention provides a system that measures distance and velocity data in real time using time-of-flight (TOF) data rather than relying upon luminosity data. The system is CMOS-compatible and provides such three-dimensional imaging without requiring moving parts. The system may be fabricated on a single IC containing both a two-dimensional array of CMOS-compatible pixel detectors that sense photon light energy, and associated processing circuitry.

In applicant's referenced utility application, now U.S. Pat. No. 6,323,942 (2001), a microprocessor on the IC continuously triggered a preferably LED or laser light source whose light output pulses were at least partially reflected by points on the surface of the object to be imaged. For good image resolution, e.g., a cm or so, a large but brief pulse of optical energy was required, for example, a peak pulse energy of perhaps low, a pulse width of about 15 ns, and a repetition rate of about 3 Khz. While average energy in applicant's earlier system was only about 1 mW, the desired 10 W peak power essentially dictated the use of relatively expensive laser diodes as a preferred energy light source. Each pixel detector in the detector array had associated electronics to measure time-of-flight from transmission of an optical energy pulse to detection of a return signal. In that invention, the transmission of high peak power narrow energy pulses required the use of high bandwidth pixel detector amplifiers.

By contrast, the present invention transmits periodic signals having a high frequency component, which signals have low average Power and low peak power, e.g., tens of mW rather than watts. Periodic signals such as an ideal sinusoid $S_1=\cos(\omega \cdot t)$ having of optical energy are relatively straightforward to analyze and will be assumed herein. Emitting low peak power periodic signals with a high frequency component such as sinusoidal optical signals permits using inexpensive light sources and simpler, narrower bandwidth pixel detectors. Bandwidths can be on the order of a few hundred KHz with an operating (emitted energy) frequency of about 200 MHz. Good resolution accuracy is still obtainable using a low peak power optical emitter in that the effective duty cycle is greater than the output from a narrow-pulsed optical emitter of higher peak power.

Assume that the energy emitted from the optical source is approximately $S_1=K\cdot\cos(\omega \cdot t)$ where K is an amplitude coefficient, $\omega=2\pi f$, and frequency f is perhaps 200 MHz, that distance z separates the optical energy emitter from the target object. For ease of mathematical representation, K=1 will be assumed although coefficients less than or greater than one may be used. The term "approximately" is used in recognition that perfect sinusoid waveforms can be difficult to generate. Due to the time-of-flight required for the energy to traverse distance z, there will be a phase shift $\Phi$ between the transmitted energy and the energy detected by a photo detector in the array, $S_2=A\cdot\cos(\omega \cdot t+\Phi)$. Coefficient A represents brightness of the detected reflected signal and may be measured separately using the same return signal that is received by the pixel detector.

The phase shift $\Phi$ due to time-of-flight is:

$$\Phi=2\cdot\omega\cdot z/C=2\cdot(2\cdot\pi\cdot f)\cdot z/C$$

where C is speed of light 300 Km/sec. Thus, distance z from energy emitter (and from detector array) is given by:

$$z=\Phi\cdot C/2\cdot\omega=\Phi\cdot C/\{2\cdot(2\cdot\pi\cdot f)\}$$

Distance z is known modulo $2\pi C/(2\cdot\omega)=C/(2\cdot f)$. If desired, several different modulation frequencies of optically emitted energy may be used, e.g., $f_1$, $f_2$, $f_3$ . . . , to determine z modulo $C/(2\cdot f_1)$, $C/(2\cdot f_2)$, $C/(2\cdot f_3)$. The use of multiple different modulation frequencies advantageously can reduce aliasing. If $f_1$, $f_2$, $f_3$ are integers, aliasing is reduced to the least common multiplier of $f_1$, $f_2$, $f_3$, denoted $LCM(f_1, f_2, f_3)$. If $f_1$, $f_2$, $f_3$ are not integers, they preferably are modeled as fractions expressible as $a_1/D$, $a_2/D$, and $a_3/D$, where i in $a_i$ is an integer, and D=(GCD) represents the greatest common divisor of $a_1$, $a_2$, $a_3$. From the above, distance z may be determined modulo $LCM(a_1, a_2, a_3)/D$.

In the present invention, phase $\Phi$ and distance z are determined by mixing (or homodyning) the signal detected by each pixel detector $S_2=A\cdot\cos(\omega \cdot t+\Phi)$ with the signal driving the optical energy emitter $S_1=\cos(\omega \cdot t)$. The mixing product $S_1\cdot S_2$ will be $0.5\cdot A\cdot\{\cos(\omega \cdot t+\Phi)+\cos(\Phi)\}$ and will have an average value of $0.5\cdot A\cdot\cos(\Phi)$. If desired, the amplitude or brightness A of the detected return signal may be measured separately from each pixel detector output.

To implement homodyne determination of phase $\Phi$ and distance z, each pixel detector in the detector array has its own dedicated electronics that includes a low noise amplifier to amplify the signal detected by the associated pixel detector, a variable phase delay unit, a mixer, a lowpass filter, and an integrator. The mixer mixes the output of low noise amplifier with a variable phase delay version of the transmitted sinusoidal signal. The mixer output is lowpass filtered, integrated and fedback to control phase shift of the variable phase delay unit. As such, the phase signal $\Phi$ is obtained by homodyning the received signal $S_2$ with a phase-delayed version of the emitted signal $S_1$ whose phase is dynamically forced to match the phase of $S_2$ by closed-loop feedback. As noted above, phase shift $\Phi$ as well as amplitude or brightness information A are obtained. In the equilibrium state, the output of each integrator is the phase $\psi$ (where $\psi=\Phi\pm\pi/2$) associated with the TOF or distance z between the associated pixel detector and a point a distance z away on the target object. The analog phase information is readily digitized, and an on-chip microprocessor can then calculate z-values from each pixel detector to an associated point on the target object. The microprocessor further can calculate dz/dt (and/or dx/dt, dy/dt) and other information if desired.

The on-chip measurement information may be output in random rather than sequential order, and object tracking and other measurements requiring a three-dimensional image are readily made. The overall system is small, robust and requires relatively few off-chip discrete components. On-chip circuitry can use such TOF data to readily simultaneously measure distance and velocity of all points on an object or all objects in a scene.

Other features and advantages of the invention will appear from the following description in which the preferred embodiments have been set forth in detail, in conjunction with their accompanying drawings.

DETAILED DESCRIPTION OF THE PREFERRED EMBODIMENT

The present invention advantageously transmits and detects optical energy that is periodic with a high frequency component, and relies upon phase shift between transmitted and detected waveforms to discern time-of-flight and thus z-distance data. Although pulsed-type periodic waveforms may be used, the present invention will be described with respect to the emission and detection of sinusoidal waveforms, as such waveforms are rather easily analyzed mathematically. However it is to be understood that periodic pulsed waveforms with a high frequency component including imperfect sinusoidal waveforms are representable mathematically as groupings of perfect sinusoidal waveforms of varying coefficients and frequency multiples. The transmission and detection of such waveforms can advantageously permit use of relatively inexpensive low peak-power optical emitters, and the use of relatively lower bandwidth amplifiers. This is in contrast to applicant's referenced U.S. Pat. No. 6,323,942 (2001) in which a low duty cycle pulse train of narrow pulse widths was emitted by a very high peak power optical emitter.

Figure 1:
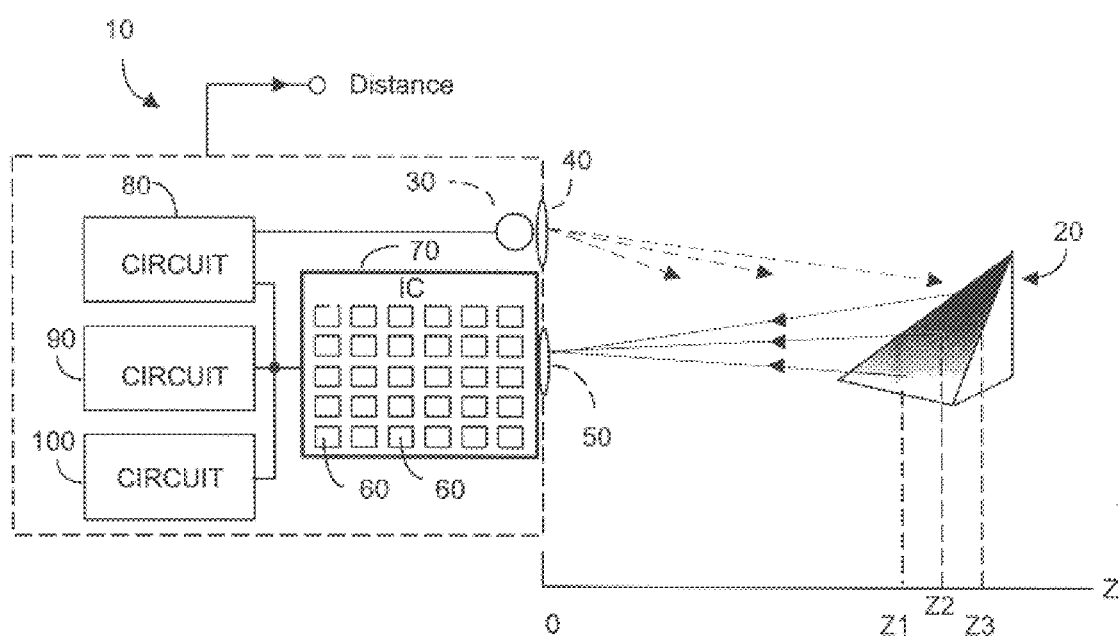
FIG. 1 is a diagram showing a generic luminosity-based range finding system, according to the prior art.
Figure 2A:
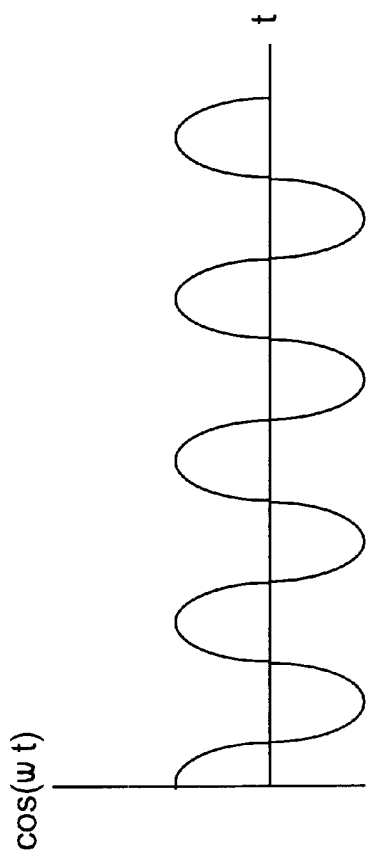
FIG. 2A depicts a transmitted periodic signal with high frequency components transmitted by the present invention, here an ideal cosine waveform.

FIG. 2A depicts the high frequency component of an exemplary idealized periodic optical energy signal as emitted by the present invention, here a signal represented as $\cos(\omega t)$. The signal is depicted as though it were AC-coupled in that any magnitude offset is not present. As described below, the operative frequency of the transmitted signal preferably is in the few hundred MHz range, and the average and the peak transmitted power may be relatively modest, e.g., less than about 50 mW or so.

Figure 2B:
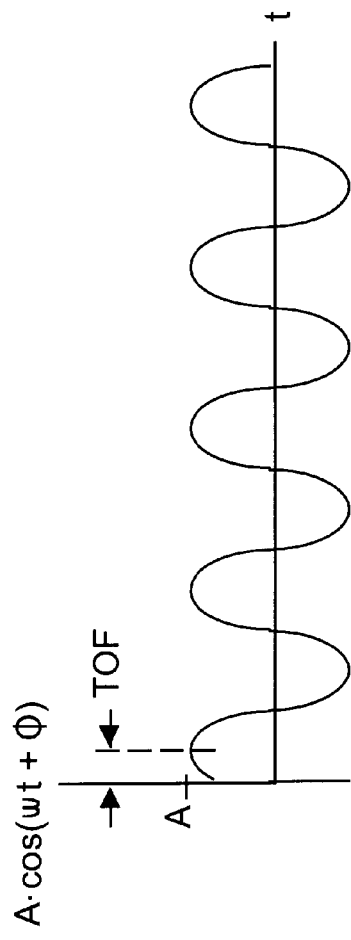
FIG. 2B depicts the return waveform with phase-delay for the transmitted signal of FIG. 2A, as used by the present invention.

A portion of the transmitted energy reaches a target object and is at least partially reflected back toward the present invention, to be detected. FIG. 2B depicts the returned version of the transmitted waveform, denoted $A \cdot \cos(\omega t + \Phi)$, where A is an attenuation coefficient, and $\Phi$ is a phase shift resulting from the time-of-flight (TOF) of the energy in traversing the distance from the present invention to the target object. Knowledge of TOF is tantamount to knowledge of distance z from a point on the object target, e.g., target 20, to the recipient pixel detector in the array of detectors within a system according to the present invention.

Specifying a repetition rate of the transmitted periodic optical energy signal involves tradeoffs that include considerations of the transmitted waveshape and duty cycle, the desired granularity in resolving z-distance, and peak power requirements for the optical energy emitter. For example, a transmitted periodic signal whose high frequency component is a few hundred MHz, e.g., 200 MHz, will be consistent with z-distance resolution on the order of a few cm or so, assuming eight-bit analog-to-digital conversion of the detected phase shift information. If the high frequency component of the transmitted periodic signal is about 50%, e.g., an idealized sinusoidal waveform or the equivalent, the peak power required from the optical energy emitter will be about 10 mW. Of course if the transmitted waveform duty cycle were decreased to say 1%, the optical energy emitter peak power would have to be increased to about 500 mW, and so on. It will be appreciated that the ability to use a low peak power optical emitter is one of the distinguishing factors between the present invention and applicant's above-referenced U.S. patent.

The processing and use of phase shift information in the present invention will now be described with reference to FIG. 3, a block diagram depicting the present invention 200, a three-dimensional imaging system that preferably is fabricated on a single IC 210. System 200 requires no moving parts and relatively few off-chip components.

System 200 includes an optical emitter, for example a low power laser diode, or low power LED, that can output a periodic signal with 50 mW or so peak power when driven with a repetition rate of a few hundred MHz and, in the preferred embodiment, a duty cycle close to 50%. At present useful optical emitters are made from materials such as GaAlAs, whose bandgap energies are quite different than that of silicon, from which CMOS IC 210 is preferably fabricated. Thus, while FIG. 3 depicts optical emitter 220 as being off-chip 210, the phantom lines surrounding emitter 220 denote that an optical emitter 220 made of CMOS-compatible materials could indeed be fabricated on IC 210.

Light source 220 is preferably a low peak power LED or a laser that emits energy with a wavelength of perhaps 800 nm, although other wavelengths could instead be used. Below 800 nm wavelength, emitted light starts to become visible and laser fabrication becomes more difficult. Above 900 nm CMOS/silicon photodiode efficiency drops off rapidly, and in any event, 1100 nm is the upper wavelength for a device fabricated on a silicon substrate, such as IC 210. By using emitted light having a specific wavelength, and by filtering out incoming light of different wavelength, system 200 can operate with or without ambient light. The ability of system 200 to function in the dark can be advantageous in certain security and military type imaging applications. Off-chip mounted lens 290 preferably focuses filtered incoming light energy onto sensor array 230 such that each pixel detector 240-x receives light from only one particular point (e.g., an object surface point) in the field of view. The properties of light wave propagation allow an ordinary lens 290 to be used to focus the light onto the sensor array. If a lens (290') is required to focus the optical light energy transmitted from emitter 220, a single lens could be used for 290, 290' if a mirror-type arrangement were used. Typical LED or laser diode emitters 220 have a shunt capacitance of perhaps 100 pF. Thus in driving emitter 220, it would be advantageous to place a small inductance (perhaps a few nH) in parallel with this capacitance, where the combined inductance-capacitance resonate at the periodic frequency of the emitter, typically a few hundred MHz. Alternatively, inductance (again a few nH) can be series-coupled to the emitter and its parasitic capacitance. If desired, such inductance can be derived using a bonding wire to the emitter.

CMOS-compatible IC 210 will preferably have fabricated thereon oscillator 225 driver, array 230 (comprising perhaps 100×100 (or more) pixel detectors 240 and 100×100 (or more) associated electronic processing circuits 250), microprocessor or microcontroller unit 260, memory 270 (which preferably includes random access memory or RAM and read-only memory or ROM), and various computing and input/output (I/O) circuitry 280, including, for example an analog/digital (A/D) conversion unit providing 10-bit A/D conversions of phase information Φ detected by the various pixel detectors in array 230. Depending upon implementation, a single on-chip A/D converter function could be provided, or a dedicated A/D converter could be provided as part of each electronic processing circuit 250. I/O circuit 280 preferably can also provide a signal to control frequency of the oscillator 225 that drives the energy emitter 220.

Figure 3:
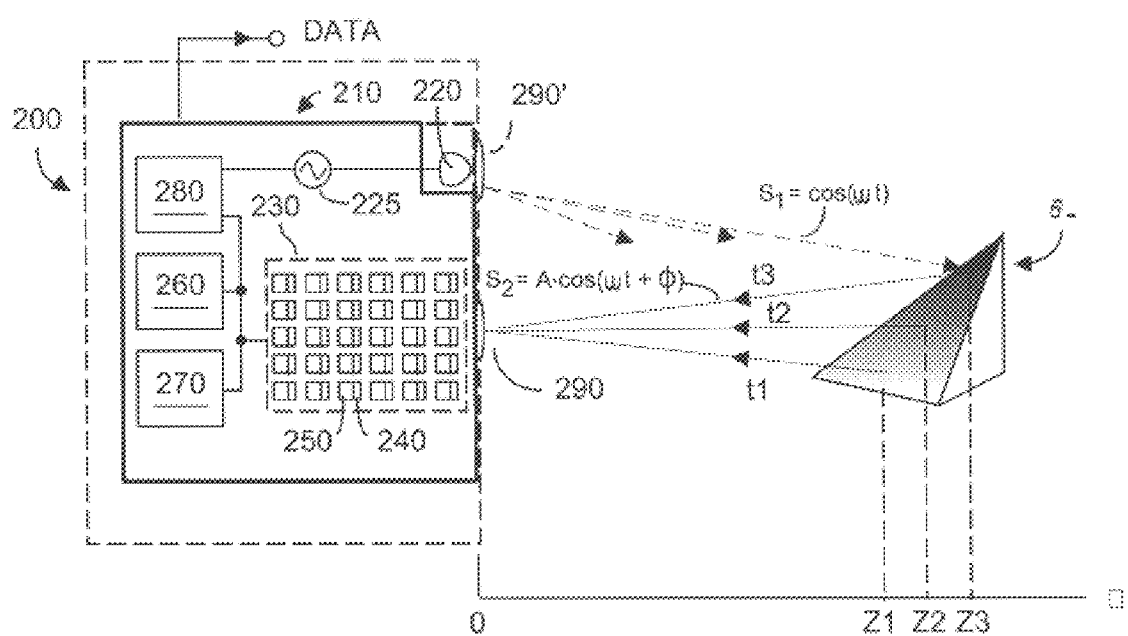
FIG. 3 is a block diagram of a preferred implementation of the present invention.

The DATA output line shown in FIG. 3 represents any or all information that is calculated by the present invention using phase-shift information from the various pixel detectors 240 in array 230. Preferably microprocessor 260 can examine consecutive frames stored in RAM 270 to identify objects in the field of view scene. Microprocessor 260 can then compute z-distance and can compute object velocity dz/dt, dx/dt, dy/dt. Further, microprocessor 260 and associated on-chip circuitry can be programmed to recognize desired image shapes, for example a user's fingers if an application using system 200 to detect user interface with a virtual input device. The data provided by microprocessor 260 could be reduced to keystroke information in such an application. Any or all of this data (denoted DATA in FIG. 3) can be exported from the IC to an external computer for further processing, for example via a universal serial bus. If microprocessor 260 has sufficient computational power, additional on-chip processing may occur as well. Note too that output from the array of CMOS-compatible detectors 240 may be accessed in a random manner if desired, which permits outputting TOF DATA in any order.

Among its other functions, microprocessor 260 acting through interface circuit 280 causes driver 225 to oscillate periodically with a desired duty cycle at a desired frequency, for example $f_1=200$ MHz. In response to signals from oscillator driver 225, laser diode or LED 220 emits optical energy at the desired frequency, e.g., $f_1=200$ MHz and duty cycle. Again, while a sinusoid or cosine waveform is assumed for ease of mathematical representation, a periodic waveform with similar duty cycle, repetition rate and peak power may be used, e.g., perhaps squarewaves. As noted, average and peak power is advantageously quite modest in the present invention, for example 10 mW. As a result, the cost of optical emitter 220 is perhaps thirty-cents compared to a cost of many dollars for a high peak power laser diode in applicant's earlier invention, described in U.S. Pat. No. 6,323,942 (2001).

The optical energy whose periodic high frequency component is ideally represented as $S_1=\cos(\omega t)$ is focused by optional lens 290' upon target object 20, some distance z away. At least some of the optical energy falling upon target 20 will be reflected back towards system 200 and will be detected by one or more pixel detectors 240 in array 230.

Due to the distance z separating system 200, more particularly a given pixel detector 240 in array 230, and the target point on object 20, the detected optical energy will be delayed in phase by some amount Φ that is proportional to time-of-flight, or to the separation distance z. The incoming optical energy detected by different pixel detectors 240 can have different phase Φ since different times-of-flight or distances z are involved. As will be described, it is the function of electronics 250 associated with each pixel detector 240 in array 230 to examine and determine the relative phase delay, in cooperation with microprocessor 260 and software stored in memory 270 executed by the microprocessor. In an application where system 200 images a data input mechanism, perhaps a virtual keyboard, microprocessor 260 may process detection data sufficient to identify which of several virtual keys or regions on a virtual device, e.g., a virtual keyboard, have been touched by a user's finger or stylus. Thus, the DATA output from system 200 can include a variety of information, including without limitation distance z, velocity dz/dt (and/or dx/dt, dy/dt) of object 20, and object identification, e.g., identification of a virtual key contacted by a user's hand or stylus.

Preferably IC 210 also includes a microprocessor or microcontroller unit 260, memory 270 (which preferably includes random access memory or RAM and read-only memory or ROM), and various computing and input/output (I/O) circuitry 280. For example, an output from I/O circuit 280 can control frequency of the oscillator 225 that drives the energy emitter 220. Among other functions, controller unit 260 may perform z distance to object and object velocity (dz/dt, dy/dt, dx/dt) calculations. The DATA output line shown in FIG. 3 represents any or all such information that is calculated by the present invention using phase-shift information from the various pixel detectors 240.

Preferably the two-dimensional array 230 of pixel sensing detectors is fabricated using standard commercial silicon technology. This advantageously permits fabricating a single IC 210 that includes the various pixel detectors 240 and their associated circuits 250, as well as circuits 225, 260, 270, 280, and preferably the energy emitter 220 as well. Understandably, the ability to fabricate such circuits and components on the same IC with the array of pixel detectors can shorten processing and delay times, due to shorter signal paths. In FIG. 3, while system 200 may include focusing lens 290 and/or 290', it is understood that these lenses will be fabricated off IC chip 210.

Each pixel detector 240 is equivalent to a parallel combination of a current source, an ideal diode, shunt impedance, and noise current source, and will output a current proportional to the amount of incoming photon light energy falling upon it. Preferably CMOS fabrication is used to implement the array of CMOS pixel diodes or photogate detector devices. For example photodiodes may be fabricated using a diffusion-to-well, or a well-to-substrate junction. Well-to-substrate photodiodes are more sensitive to infrared (IR) light, exhibit less capacitance, and are thus preferred.

Figure 4:
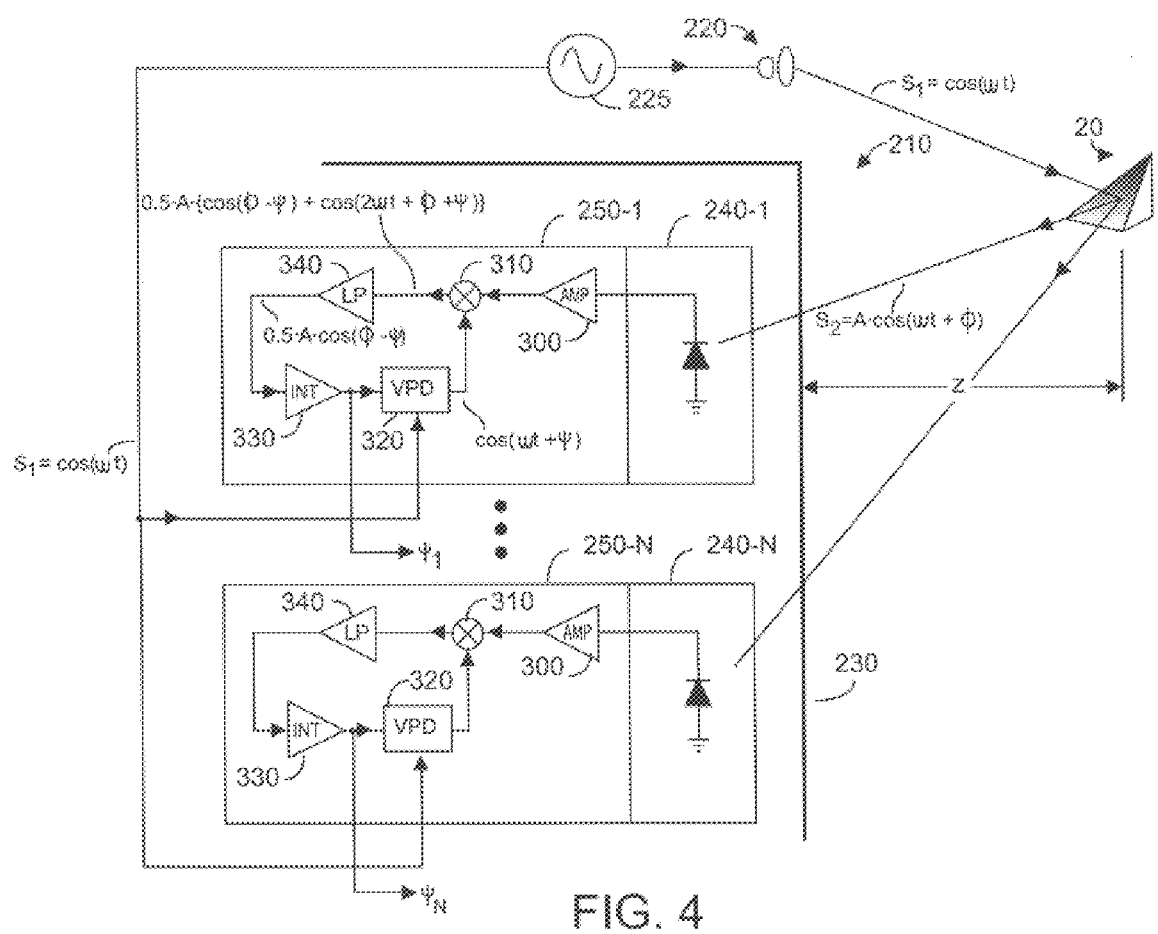
FIG. 4 is block diagram showing an individual pixel detector with associated electronics, according to the present invention.

FIG. 4 shows a portion of IC 210 and of array 230, and depicts pixel detectors 240-1 through 240-x, and each diode's associated exemplary electronics 250-1 through 250-x. For ease of illustration only two pixel diodes 240 and two associated electronic circuits 250 are depicted, however an actual array will include hundreds or thousands or more of such pixel detectors and associated electronic circuits. As noted, if desired a dedicated A/D converter could be provided as part of each electronics circuit 250-x through 250-x, as opposed to implementing an omnibus A/D function on IC chip 210.

Let us now consider detection of incoming optical energy by pixel detector 240-1. Assuming that a low power LED or laser diode or the like 220 emits optical radiation having idealized high frequency component $S_1=\cos(\omega \cdot t)$, a fraction of such radiation reflected from a point on the surface of target 20 (distance z away) is given by $S_2=A\cdot\cos(\omega\cdot t+\Phi)$. Upon receiving this incoming radiation, pixel detector 240-1 outputs a signal that is amplified by low noise amplifier 300. An exemplary amplifier 300 might have a gain of perhaps 12 dB.

As noted, periodic emissions from optical source 220 are sinusoidal or sinusoidal-like with a high frequency component of a few hundred MHz. Despite this high optical emission frequency, it suffices for amplifier 300 to have a bandwidth of perhaps 100 KHz or so, perhaps as low as tens of KHz because all of the frequencies of interest are themselves close to this modulation frequency. It will be appreciated that providing hundreds or thousands of low noise relatively low bandwidth amplifiers 300 on IC 210 is an easier and more economical undertaking than providing high bandwidth amplifiers able to pass narrow pulses, as in applicant's parent invention.

As will be clear upon examining FIG. 4, array 230 can function with relatively small bandwidth amplifiers 300 as the output from each amplifier 300 is coupled directly to a first input of an associated mixer 310 that receives as a second input a signal of like frequency as that present at the first input. It is noted that if each amplifier 300 and its associated mixer 310 were implemented as a single unit, it could suffice for the overall unit to have a bandwidth on the order of tens of KHz, and a high frequency response also on the order of tens of KHz.

As shown in FIG. 4, when comparing the detected signal to the transmitted signal, there will be a phase shift p that is related to TOF and to distance z.

Each circuit 250-x couples the output of the associated low noise amplifier 300 to the first input of a mixer 310. Those skilled in the art of signal processing and circuit design will appreciate that mixer 310 may be implemented in many ways, for example using Gilbert cells, digital multipliers, etc.

In essence, each mixer will homodyne the amplified detected output signal $S_2$ from an associated pixel detector 240 with a generator 225 signal $S_1$. Assuming that the optical energy emitted has an idealized high frequency component represented as a sine wave or cosine wave, the mixer output product $S_1 \cdot S_2$ will be $0.5 \cdot A \cdot \{\cos(\omega\cdot t+\Phi)+\cos(\Phi)\}$ and will have an average value of $0.5\cdot A\cdot\cos(\Phi)$. If desired, the amplitude or brightness A of the detected return signal may be measured separately from each pixel detector output. In practice, a ten-bit analog-to-digital resolution of $A\cdot\cos(\Phi)$ will result in about 1 mm resolution for z-measurements.

Each multiplier 310 will have a second input that is coupled to the output of a variable phase delay (VPD) unit 320. VPD units 320 may be implemented in many ways, for example using a series-coupled string of invertors whose operating power supply voltage is varied to speed-up or slow-down the ability of each inverter to pass a signal. A first input to each VPD unit 320 will be derived from signal generator 225, and will be $S_1=\cos(\omega t)$, give or take a signal coefficient. Assume that VPD 320 adds a variable time delay $\psi$ to the $\cos(\omega t)$ signal derived from generator 225. Mixer 310 then mixes the amplified $\cos(\omega\cdot t+\Phi)$ signal output by amplifier 300 with the $\cos(\omega\cdot t+\psi)$ signal output by VPD 320. Mixer 310 now outputs signals including $0.5\cdot A\cdot\{\cos(\Phi-\psi)+\cos(2\cdot\omega\cdot t+\Phi+\psi)\}$. The output of mixer 310 is coupled to the input of a low pass filter 340 that preferably has a bandwidth of a 100 Hz or so to a few KHz or so, such that the output from filter 340 will be a low frequency signal proportional to $0.5\cdot A\cdot\cos(\Phi-\psi)$. This low frequency signal is now input to an integrator 330 whose output will be $\Phi_x$ for pixel detector $240_x$.

Note that VPD 320 is driven by two signals each having the same frequency as that emitted by optical emitter 220, albeit with a phase difference $(\Phi-\psi)$. Because the two signals being mixed are derived from the same reference source frequency, the mixing process is referred to a homodyning rather than heterodyning. Note that if phase shift $\psi>\Phi$, the polarity of the signal output from integrator 330 changes. In the configuration shown in FIG. 4, phase shift $\psi_x=\Phi_x\pm 90°$ associated with the return signal detected by each pixel detector 240-x is available from that pixel detector's integrator 330-x.

The phase shift $\psi$ due to time-of-flight may be given by:

$$\Phi=2\cdot\omega\cdot z/C=2\cdot(2\cdot\pi\cdot f)\cdot z/C$$

where C is speed of light 300,000 Km/sec. Thus, distance z from energy emitter 220 to a pixel detector 240-x in array 230 is given by:

$$z=\Phi\cdot C/2\cdot\omega=\Phi\cdot C/\{2\cdot(2\cdot\pi\cdot f)\}$$

Distance z is known modulo $2\pi C/(2\cdot\omega)=C/(2\cdot f)$. Using several different modulation frequencies such as $f_1$, $f_2$, $f_3$ ..., permits determining distance z modulo $C/(2\cdot f_1)$, $C/(2\cdot f_2)$, $C/(2\cdot f_3)$, etc., and further avoids, or at least reduces, aliasing. For example, microprocessor 260 can command generator 225 to output sinusoidal drive signals of chosen frequencies, e.g., $f_1$, $f_2$, $f_3$, etc. If $f_1$, $f_2$, $f_3$ are integers, e.g., i=integer, aliasing is reduced to the least common multiplier of $f_1$, $f_2$, $f_3$, denoted $LCM(f_1, f_2, f_3)$. If $f_1$, $f_2$, $f_3$ are not integers, they preferably are modeled as fractions expressible as $a_1/D$, $a_2/D$, $a_3/D$, where $a_i$ denotes integer i, and $D=GCD(a_1, a_2, a_3)$, where GCD denotes greatest common divisor. Distance z can then be determined modulo $LCM(a_1, a_2, a_3)/D$.

The configuration of FIG. 4 presents a closed-loop feedback circuit that reaches a stable point when the two input signals to each mixer 310 are 90° out of phase with respect to each other, e.g., $\psi_x=\Phi_x\pm 90°$. At this ±90° out-of-phase steady-state, the output signal from each lowpass filter 340 will be, ideally, null. For example, should the output signal from a lowpass filter 340 signal go positive, then the output signal from the associated integrator 330 will add more phase shift to drive the lowpass filter output back towards a null state.

When the feedback system is at a stable state, the pixel detector electronics 250-x in array 230 provide various phase angles $\psi_1$, $\psi_2$, $\psi_3$, ... $\psi_N$, where $\psi_x=\Phi_x\pm 90°$. The phase angles are preferably converted from analog format to digital format, for example using an analog/digital converter function associated with electronics 280. Advantageously there is little accuracy loss for phase values close to $\Phi=0$ and for $\Phi=-\pi$. This improved accuracy is in contrast to prior art systems that attempt to mix signals having a constant phase value for all pixels. However such prior art approaches are relatively simple to implement, and the present invention could also mix signals with a constant phase, if desired. Advantageously microprocessor 260 can then execute software, e.g., stored or storable in memory 270 to calculate z-distances (and/or other information) using the above mathematical relationships. If desired, microprocessor 260 can also command generator 225 to output discrete frequencies e.g., $f_1, f_2, f_3$ ... to improve system performance by reducing or even eliminating aliasing errors.

The configuration of FIG. 4 is analogous to a delay lock loop, as the homodyne output signal is used to vary phase ($\psi$) between optical emitter 220 and the signal input to mixer 310 along with the sensed return signal output from amplifier 300. As a byproduct of this configuration, the output signal from integrator 330 will be proportional to $\psi$. Advantageously, delay lock loop configurations such as shown in FIG. 4 can exhibit low noise peaks, especially at frequencies near the fundamental frequency of interest. These advantages are inapposite to the performance of typical phase lock loop configurations.

In essence, the delay lock loop configuration of FIG. 4 is analogous to a zero-intermediate frequency (IF) system. But by using a low IF system, in-band spectrum aliasing and out-of-band noise may be attenuated using less critical and most cost-effective components and circuits, for example switched capacitor filters. Furthermore, low-frequency 1/f type noise appears to be more greatly attenuated in-band in low-IF systems since there is no direct mixing with the carrier frequency. After low pass filtering, low IF systems return a signal proportional to $\cos(\omega_c \cdot t + \Phi - \psi)$, where $\omega_c$ is the IF frequency that is the difference between the optical modulation frequency (e.g., the signal emitted from 220) and the frequency with which it is mixed. This signal can be further mixed with a signal from a local oscillator having frequency $\omega_c$. Alternatively, one can digitize the return signal and extract $\psi$ using digital multipliers and filters.

Requirements for linearity of homodyne type detectors can be further relaxed if very low near-channel interference is present, a condition that advantageously reduces circuit power dissipation and complexity. Alternatively, low IF systems can enjoy further circuit simplification resulting from the less stringent specifications required on the low pass filter and on mixer linearity.

Thus, if desired homodyning in the present invention can be implemented as a two-step process. First the detected return signal $S_2$ is multiplied with a signal having not exactly the same frequency but a frequency synchronized with the original frequency of the emitted signal $S_1$. Thus, instead of obtaining $\cos(\Phi)$ at the input of each integrator 330, what results is a signal $\cos(\omega_c \cdot t + \Phi - \psi)$, where $\omega_c$ is the difference between the two frequencies. This intermediate difference frequency can then be homodyned again with $\omega_c$ to return $\psi$ at the output of each integrator 330.

Thus, various implementations may be used with the present invention to generate phase angle $\psi = \Phi \pm 90°$. Assume that a given application requires acquisition of an image at a frame rate of 30 frames/second. In such application, it suffices to sample phase angle $\psi$ during A/D conversion with a sample rate of about 30 ms. This sample rate is commensurate with the relatively low bandwidth otherwise present within electronics 250-x, as shown in FIG. 4. In practice, system 200 can provide z-distance resolution of about 1 cm and in practical applications, z-range will be within perhaps 100 m or less.

Although z-distance is determined from TOF information acquired from phase delay $\psi$, it is noted that the relative brightness of the signals returned from target object 20 can also provide useful information. The amplitude coefficient "A" on the return signal is a measure of relative brightness.

Note that while the preferred embodiment shown in FIG. 4 uses a feedback configuration that seeks to achieve a minimum output signal from the lowpass filters 340, a maximum lowpass filter output signal could instead be used with slight alteration. A maximum lowpass filter output signal would represent brightness coefficient A. Such a configuration could be implemented using a signal 90° out-of-phase with the output from VPD 320 to modulate another copy of the output of the low noise amplifier 300. The average amplitude of the thus-modulated signal would be proportional to coefficient A in the incoming detected return signal.

Movement of objects within a detected image contour can be computed, e.g., by microprocessor 260, by identifying contour movements between frames of acquired data. The pixel detectors within the contour can all receive a uniform velocity that is the velocity of the contour. Since objects can be identified using their contours, one can track objects of interest using the on-chip processor 260. As such, if desired IC chip 210 can export a single value (DATA) that can represent change in location of the entire object 20 whenever it has moved. Thus instead of exporting from the IC chip an entire frame of pixels at the frame rate, a single vector representing the change in location of the object of interest may instead be sent. So doing results in a substantial reduction in IC chip input/output and can greatly reduce off-chip data processing requirements.

In other applications, system 200 may be called upon to recognize an object that is a virtual input device, for example a keyboard whose virtual keys are "pressed" by a user's fingers. For example, in co-pending U.S. application Ser. No. 09/502,499, filed Feb. 11, 2000, and entitled "Method and Apparatus for Entering Data Using a Virtual Input Device" a three-dimensional range-finding TOF system is used to implement virtual input devices. As a user's hand or stylus "presses" a virtual key or region on such device, the system using TOF measurements can determine which key or region is being "pressed". The system can then output the equivalent of key stroke information to a companion device, for example a PDA that is to receive input data from the interaction of a user with the virtual input device. The present invention may be used in such application, in which case DATA in FIG. 3 could represent keystroke identification information that has been processed on-chip by microprocessor 260.

As noted, microprocessor 260 executing software perhaps associated with memory 270 can control modulation of generator 225 and detection by the various electronic circuits 250. If desired, detection signals may be processed using special image processing software. Since system 200 preferably can be battery operated due to its low power consumption, when such software determines that sufficient image resolution is attained, operating power may be terminated selectively to various portions of array 230. Further if sufficient photon energy reaches array 230 to ensure adequate detection, the shape of signals output by emitter 220 could be changed. For example, the peak power and/or duty cycle of the emitter energy could be reduced, thus reducing overall power consumption by system 200. The design tradeoffs in changing the shape of the optical energy output signal involve considerations of z-resolution accuracy, user safety, and power handling capacity of emitter 220.

In summary, the overall system advantageously can be operated from a small battery in that peak and average power from optical emitter 220 is preferably in the tens of mW range. Nonetheless distance resolution is in the cm range, and signal/noise ratios are acceptable.

Modifications and variations may be made to the disclosed embodiments without departing from the subject and spirit of the invention as defined by the following claims.

What is claimed is:

1. A method to determine distance z between a pixel detector and a target, the method comprising the following steps:

(a) illuminating said target with optical energy having a periodic waveform that includes a high frequency component $S_1(\omega \cdot t)$;

(b) disposing said pixel detector so as to detect an optical energy signal having a high frequency component $S_2(\omega \cdot t) = A \cdot S_1(\omega \cdot t - \Phi)$ reflected from said target, where A is a coefficient proportional to brightness of said target, and $\Phi$ is phase shift proportional to time-of-flight of light over said distance z; and (c) homodyne signal-processing said signal $S_2(\omega \cdot t)$ to generate a phase signal $\Phi$ proportional to said distance z and to preserve said coefficient A;

wherein homodyne signal-processing at step (c) is carried out using an internally generated signal whose frequency is derived from said $S_1(\omega \cdot t)$ and whose phase is dynamically forced by closed loop feedback to track said high frequency component $S_2(\omega \cdot t)$.

2. The method of claim 1, wherein at step (a), said high frequency component $S_1(\omega \cdot t)$ is approximated by $S_1(\omega \cdot t) = \cos(\omega \cdot t)$.

3. The method of claim 1, wherein:

step (b) includes providing an array of pixel detectors; and step (c) includes generating said phase signal $\Phi$ for a detected said signal output by each of said pixel detectors.

4. The method of claim 1, wherein step (c) includes homodyne-mixing said signal $S_2(\omega \cdot t)$ with a signal proportional to $S_1(\omega \cdot t + \psi)$, where $\psi$ is a variable time delay representing an offset phase angle.

5. The method of 4, wherein step (c) includes subjecting said input signal $S_1(\omega t)$ to a variable phase delay to generate said $S_1(\omega \cdot t + \psi)$.

6. The method of claim 4, wherein at steady-state, $\psi = \Phi \pm 90°$.

7. The method of claim 4, wherein step (c) further includes varying said $\psi$ to find zero average value for a homodyne product $S_1 \cdot S_2$.

8. The method of claim 4, wherein step (c) further includes reducing high frequency components in $S_1 \cdot S_2$ to yield an average value for a homodyne product $S_1 \cdot S_2$.

9. The method of claim 4, wherein step (c) further includes integrating an average value for said homodyne product $S_1 \cdot S_2$ to produce said $\psi$.

10. The method of claim 1, further including estimating magnitude of said co-efficient A.

11. The method of claim 1, further including a step of estimating magnitude of said co-efficient A by homodyne mixing $S_2$ with $S_1(\omega \cdot t + \psi + \pi/2)$, where $\psi$ is a variable time delay representing an offset phase angle.

12. The method of claim 4, wherein step (c) includes homodyne-mixing said $S_2$ with a signal of close frequency that is phase locked onto $S_1$ to yield an intermediate frequency signal $\omega_c$, and at least one step selected from a group consisting of (i) homodyne-mixing a resulting intermediate signal again with said $\omega_c$, and (ii) directly digitizing said intermediate frequency signal $\omega_c$ and extracting $\Phi$ using digital signal processing.

13. The method of claim 1, wherein step (a) includes generating a plurality of discrete frequencies $\omega_i$ selected to reduce aliasing.

14. The method of claim 1, wherein each said step is carried out by circuitry fabricated on a CMOS integrated circuit, said integrated circuit including an array of pixel detectors each identical to said pixel detector.

15. The method of claim 14, wherein said integrated circuit includes a microprocessor, and at least step (c) is executed by said microprocessor.

16. A CMOS-implementable integrated circuit (IC) time of flight (TOE) measurement system used with an optical emitter to determine distance z between said IC and a target, the IC including:

a generator coupleable to said optical emitter to cause said optical emitter to output a signal having a high frequency component $S_1(\omega \cdot t)$;

an array of pixel detectors to detect an optical energy signal having a high frequency component representable as $S_{2i}(\omega \cdot t) = A_i \cdot S_1(\omega \cdot t - \Phi)$ reflected from said target, where i is an integer representing an i-th one of said pixel detectors, $A_i$ is a coefficient proportional to brightness of said target as perceived by the i-th one of said pixel detectors, and $\Phi_i$ is phase shift proportional to time-of-flight of light over said distance z;

for each of said pixel detectors, an associated electronic circuit coupled to receive and homodyne signal-process said signal $S_{2i}(\Phi \cdot t)$ and to generate a phase signal $\Phi_i$ proportional to said distance z and to preserve said coefficient $A_i$;

wherein homodyne signal-processing is carried out using a signal, internally generated by said circuit, whose frequency is derived from said $S_1(\omega \cdot t)$ and whose phase is dynamically forced by closed loop feedback to track said high frequency component $S_2(\omega \cdot t)$.

17. The IC of claim 16, wherein said high frequency component $S_1(\omega \cdot t)$ is approximated by $S_1(\omega \cdot t) = \cos(\omega \cdot t)$.

18. The IC of claim 16, wherein said electronic circuit signal processes by homodyne-mixing said signal $S_{2i}(\omega \cdot t)$ with a signal proportional to $S_1(\omega \cdot t + \psi_i)$, where $\omega_i$ is a variable time delay representing an offset phase angle that at steady-state is $\Phi_i \pm 90°$.

19. The IC of claim 18, wherein said electronic circuit signal processes by subjecting said signal $S_1(\omega t)$ to a variable phase delay to generate said $S_1(\omega \cdot t + \psi)$.

20. The IC of claim 18, wherein said electronic circuit further signal processes by carrying out at least one function selecting from a group consisting of (a) varying said $\psi_i$ to find zero average value for a homodyne product $S_1 \cdot S_{2i}$, (b) reducing high frequency components in $S_1 \cdot S_{2i}$ to yield an average value for a homodyne product $S_1 \cdot S_{2i}$, (c) integrating an average value for said homodyne product $S_1 \cdot S_{2i}$ to produce said $\psi_i$, and (d) estimating magnitude of said co-efficient $A_i$.

* * * * *